(12) United States Patent
Mouly

(10) Patent No.: US 11,555,454 B2
(45) Date of Patent: Jan. 17, 2023

(54) TRIPLE FLOW AIRCRAFT TURBOMACHINE PROVIDED WITH A POWER TRANSMISSION MODULE

(71) Applicant: SAFRAN TRANSMISSIONS SYTEMS, Colombes (FR)

(72) Inventor: Guillaume Pierre Mouly, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/583,336

(22) Filed: Jan. 25, 2022

(65) Prior Publication Data
US 2022/0235710 A1   Jul. 28, 2022

(30) Foreign Application Priority Data

Jan. 26, 2021   (FR) ...................................... 2100692

(51) Int. Cl.
*F02C 7/36* (2006.01)
*F02C 7/06* (2006.01)
*F02K 3/077* (2006.01)

(52) U.S. Cl.
CPC ............. *F02C 7/36* (2013.01); *F02C 7/06* (2013.01); *F02K 3/077* (2013.01); *F05D 2220/323* (2013.01); *F05D 2240/54* (2013.01); *F05D 2250/232* (2013.01); *F05D 2260/40311* (2013.01)

(58) Field of Classification Search
CPC .... F02C 7/36; F02C 7/06; F02K 3/077; F05D 2220/323; F05D 2240/54; F05D 2250/232; F05D 2260/40311; Y02T 50/60

USPC ....................................................... 415/122.1
See application file for complete search history.

(56) References Cited

U.S. PATENT DOCUMENTS

| 9,488,101 B2 | 11/2016 | Kupratis |
| 2013/0225353 A1 | 8/2013 | Gallet et al. |
| 2022/0065171 A1* | 3/2022 | Stretton .................... F02C 7/32 |

FOREIGN PATENT DOCUMENTS

| EP | 3067541 A2 | 9/2016 |
| EP | 2831396 B1 | 9/2017 |
| FR | 2987416 A1 | 8/2013 |
| FR | 3008462 A1 | 1/2015 |
| FR | 3008463 A1 | 1/2015 |
| FR | 3041054 A1 | 3/2017 |
| WO | 2010/092263 A1 | 8/2010 |

OTHER PUBLICATIONS

Preliminary Research Report received for French Application No. 2100692, dated Oct. 8, 2021, 3 pages (1 page of French Translation Cover Sheet and 2 pages of original document).

* cited by examiner

*Primary Examiner* — Yi-Kai Wang
(74) *Attorney, Agent, or Firm* — Womble Bond Dickinson (US) LLP

(57) ABSTRACT

A triple-flow turbomachine for an aircraft, including a power transmission module including a torque input connected to a turbine shaft, a first torque output of a gearbox connected to a main shaft for rotatably driving a main fan propeller, and a second torque output of a planet gear connected to a secondary shaft for rotatably driving a secondary fan propeller. The planet gear is independent of the gearbox and arranged downstream of the gearbox.

10 Claims, 5 Drawing Sheets

[Fig.1]
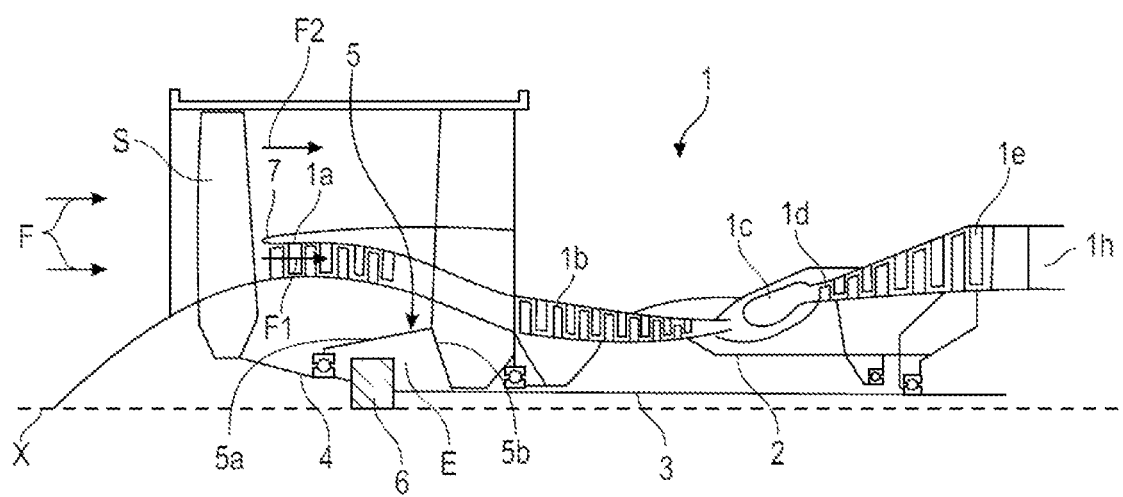

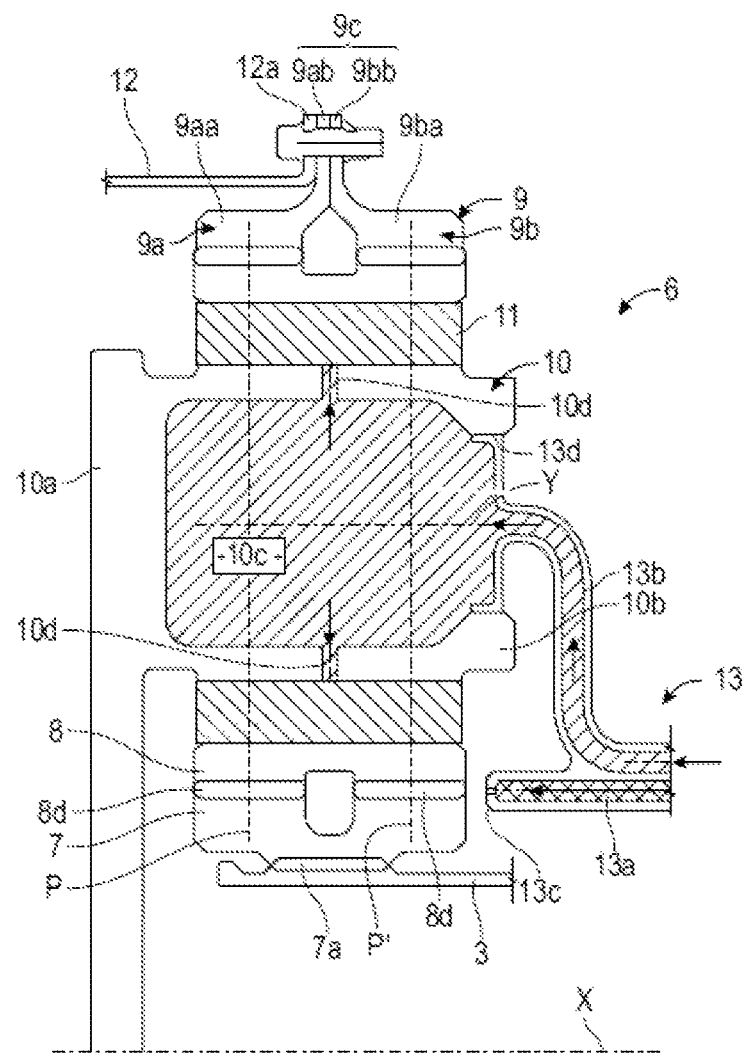
[Fig.2]

[Fig.3]
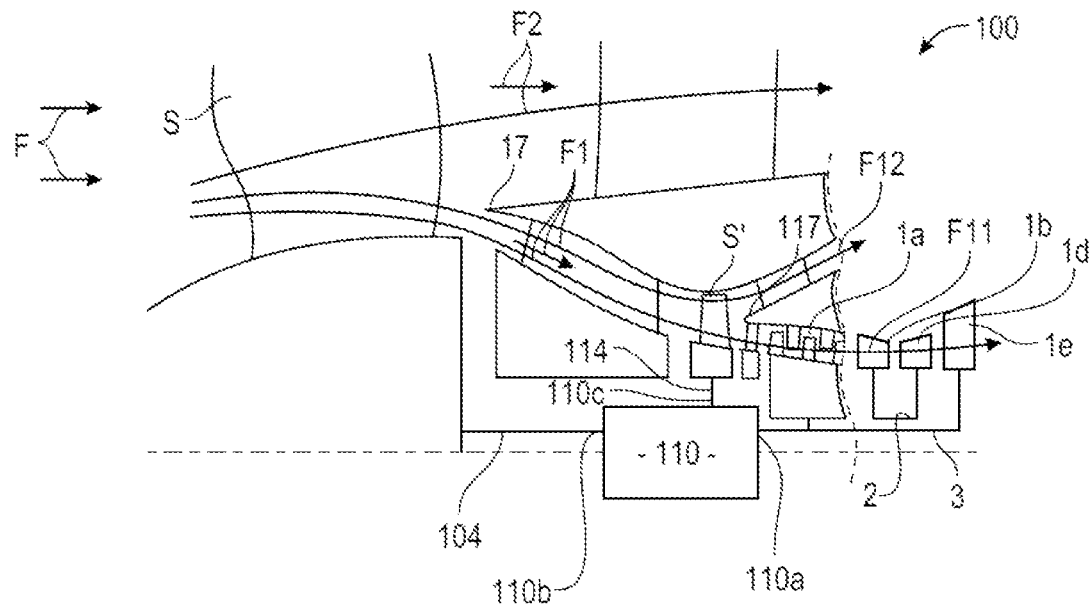
[Fig.4]
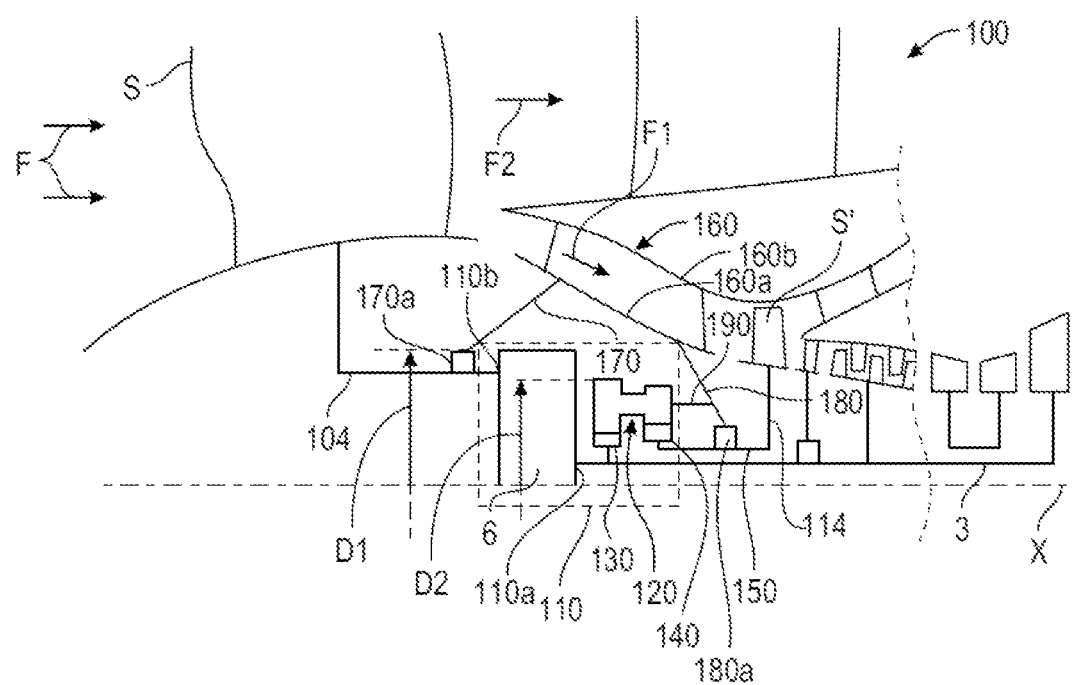

[Fig.5]
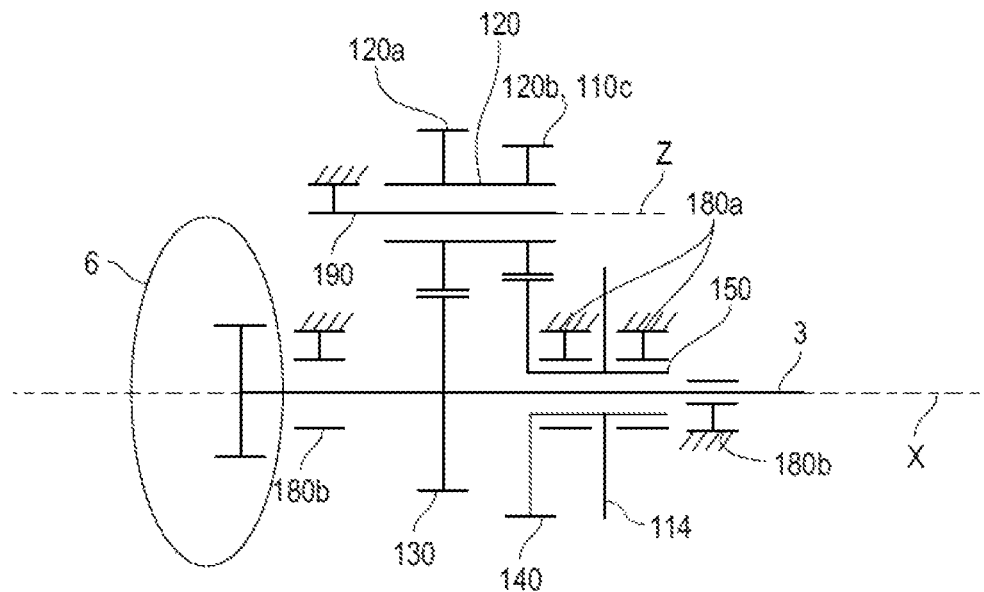
[Fig.6]
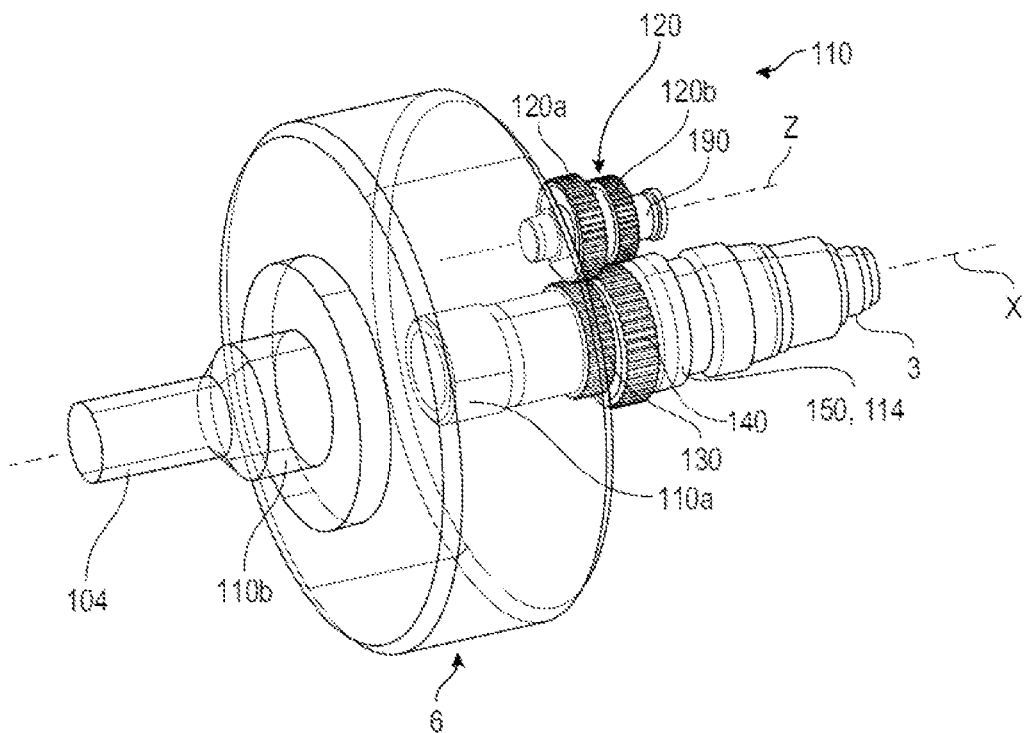

[Fig.7]
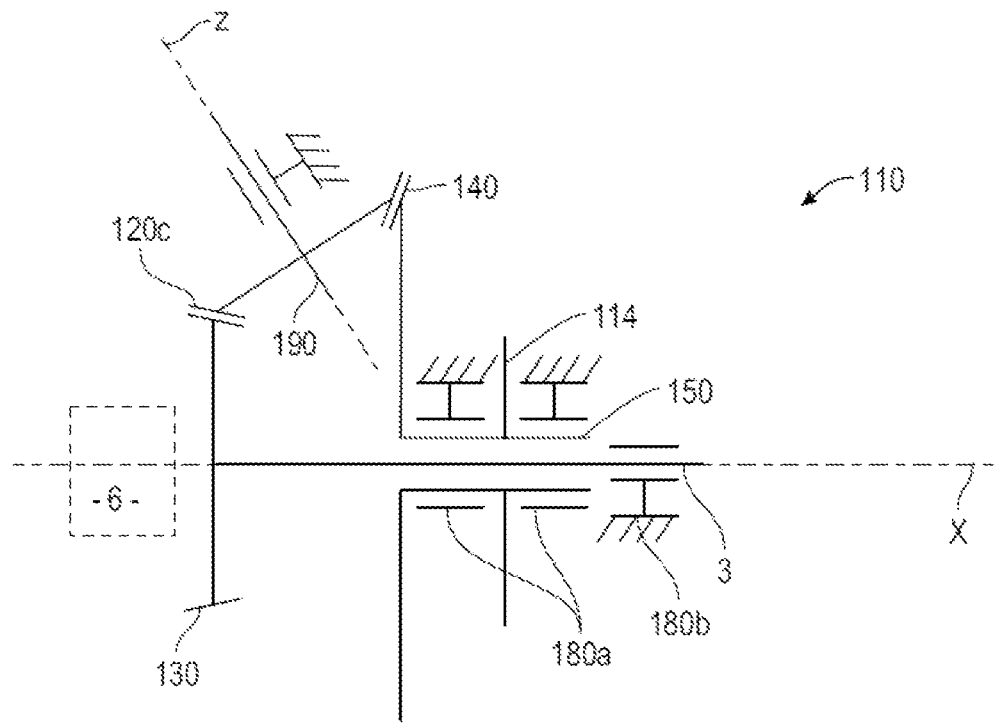
[Fig.8]
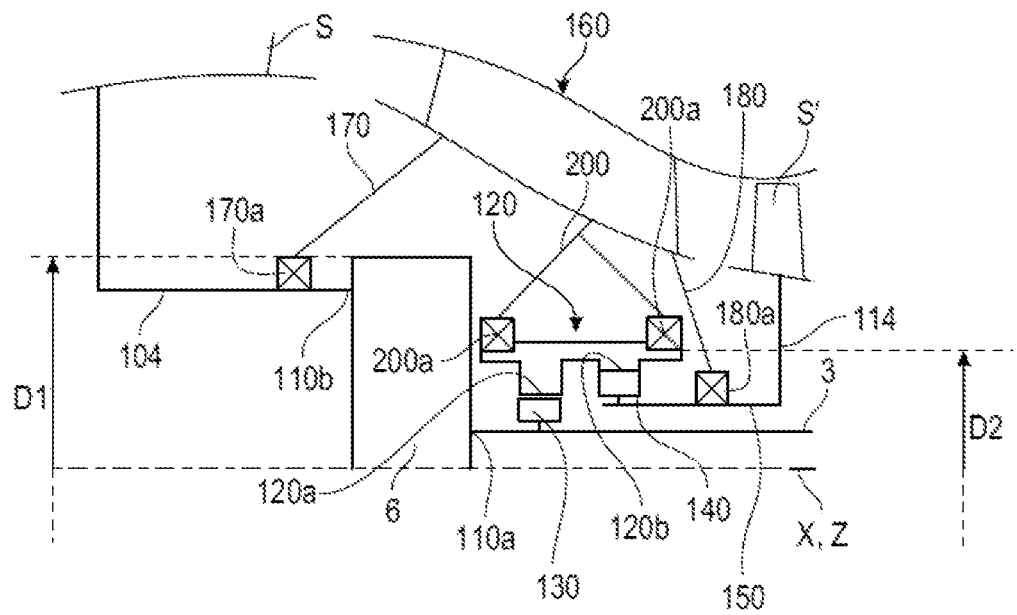

TRIPLE FLOW AIRCRAFT TURBOMACHINE PROVIDED WITH A POWER TRANSMISSION MODULE

TECHNICAL FIELD OF THE INVENTION

The present invention relates to the field of triple-flow turbomachines, in particular for an aircraft.

BACKGROUND

The prior art comprises in particular the documents WO-A1-2010/092263, FR-A1-2 987 416, FR-A1-3 008 462, FR-A1-3 008 463, U.S. Pat. No. 9,488,101 B1, EP-A2-3 067 541, EP-B1-2 831 396 and FR-A1-3 041 054.

The newer generations of double-flow turbomachines, in particular those with a high bypass ratio, comprise a mechanical gearbox to drive a shaft of a fan propeller. The usual purpose of the gearbox is to convert the speed of rotation referred to as high speed of the shaft of a power turbine into a slower speed of rotation for the shaft driving the fan propeller.

Such a gearbox generally comprises a central pinion, referred to as a sun gear, a ring gear and pinions called planet gears, which are engaged between the sun gear and the ring gear. The planet gears are held by a chassis referred to as planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetaries. These axes are parallel to the longitudinal axis X.

There are several gearbox architectures. In the prior art of the double-flow turbomachines, the gearboxes are of the planetary or epicyclic type. In other similar applications, there are architectures referred to as differential or "compound".

In a planetary gearbox, the planet carrier is stationary and the ring gear is the output shaft of the device which rotates in the opposite direction of the sun gear.

In an epicyclic gearbox, the ring gear is stationary and the planet carrier is the output shaft of the device which rotates in the same direction as the sun gear.

On a compound gearbox, no element is attached in rotation. The ring gear rotates in the opposite direction of the sun gear and the planet carrier.

The gearboxes can consist of one or more gear stages. This meshing is ensured in different ways such as by contact, friction or magnetic field.

In the present application, "stage" or "toothing" means at least one series of meshing teeth with at least one series of complementary teeth. A toothing can be internal or external.

A planet gear may comprise one or two gear stages. A single-stage planet gear comprises a toothing that can be straight, helical or herringbone, and whose teeth are located on a same diameter. This toothing cooperates with both the sun gear and the ring gear.

A double-stage planet gear comprises two toothings that are located on different diameters. A first toothing cooperates with the sun gear and a second toothing generally cooperates with the ring gear.

The new generations of triple-flow turbomachines are extensions of the high bypass ratio double-flow turbomachines. A triple-flow turbomachine typically comprises a mechanical gearbox to drive the fan propeller and another propeller that can be considered a smaller fan or a secondary fan. The gearbox is part of a power transmission module which is used to rotatably drive the main fan shaft on the one hand and to drive the secondary fan shaft on the other.

However, the technologies currently proposed for this type of power transmission module are not satisfactory, particularly from the point of view of their complexity, their overall dimensions and their mass.

The invention provides an improvement allowing to ameliorate some or all of these disadvantages.

SUMMARY OF THE INVENTION

The invention relates to a triple-flow turbomachine for an aircraft, comprising:
- a gas generator equipped with a turbine comprising a turbine shaft with an axis of rotation,
- a power transmission module comprising a torque input connected to said turbine shaft, a first torque output and a second torque output, said power transmission module comprising a mechanical gearbox comprising said torque input and said first torque output,
- a main fan propeller rotatably driven by a main shaft coupled to the first torque output, this propeller being located upstream of a first annular splitter nose for separating two annular ducts for the respective flow of an internal primary flow and an external secondary flow,
- a secondary fan propeller rotatably driven by a secondary shaft coupled to the second torque output, this propeller being located in the duct for the flow of the primary flow and upstream of a second annular splitter nose for separating two annular ducts for the respective flow of a first internal flow and a second external flow, characterised in that the power transmission module further comprises a planet gear independent of said gearbox and arranged downstream of the gearbox, this planet gear being meshed, on the one hand, with an external toothing of the turbine shaft and, on the other hand, with an external toothing of said secondary shaft or with an intermediate shaft coupled to this secondary shaft, said turbine shaft passing coaxially through this secondary shaft or this intermediate shaft.

The invention thus proposes to associate with the driving gearbox of the propeller of the main fan, an additional planet gear for driving the propeller of the secondary fan. The power transmission module therefore comprises the gearbox and an additional planet gear mounted downstream of the gearbox and independent of the gearbox. This planet gear can have relatively small dimensions and a relatively limited overall dimensions, which facilitates its integration into the turbomachine.

This solution is compatible with a multi-stage gearbox. It is also compatible with a gearbox with a rotating planet carrier such as the epicyclic or differential gearboxes. It is also compatible with a gearbox with straight, helical or herringbone toothings. It is also compatible with a gearbox with monobloc planet carrier or of the cage and cage carrier type.

The turbomachine according to the invention may comprise one or more of the following characteristics, taken in isolation from each other, or in combination with each other:
said planet gear is unique;
said planet gear extends about an axis of rotation parallel to said axis of rotation of the turbine shaft, said planet gear comprising a first toothing meshed with the external toothing of the turbine shaft, and a second toothing meshed with the external toothing of the secondary shaft or of the intermediate shaft;

said planet gear extends about an axis of rotation inclined with respect to said axis of rotation of the turbine shaft, said planet gear comprising a conical pinion meshed with both the external toothings, which are also conical, of the turbine shaft and of the secondary shaft or of the intermediate shaft;

said planet gear extends about an axis of rotation coincident with the axis of rotation of the turbine shaft, said planet gear having an annular shape and being passed through by said turbine shaft, said planet gear comprising a first toothing meshed with the external toothing of the turbine shaft, and a second toothing meshed with the external toothing of the secondary shaft or of the intermediate shaft;

the gearbox comprises an external diameter D1, and the planet gear is surrounded by a circumference centred on said axis of rotation of the turbine shaft, this circumference having a maximum external diameter D2 which is smaller than D1;

the transmission module is located inside an annular casing which comprises two coaxial annular walls defining between them said duct for the flow of the primary flow;

the main shaft is rotatably guided by at least one bearing carried by a first annular support attached to said casing, and the secondary shaft or the intermediate shaft is rotatably guided by at least one bearing carried by a second annular support attached to said casing;

the planet gear comprises a physical axle which passes through it and is rotatably driven by this physical axle, this physical axle being carried by said second bearing support or by said casing;

the planet gear is passed through by a physical axle and is rotatable on this physical axle, this physical axle being carried by said second bearing support or by said casing;

the planet gear is rotatably guided by at least one bearing carried by a third annular support attached to said casing, the third annular support being located between the first and second annular supports.

BRIEF DESCRIPTION OF FIGURES

Further characteristics and advantages will be apparent from the following description of a non-limiting embodiment of the invention with reference to the appended drawings in which:

FIG. 1 is a schematic axial sectional view of a double-flow turbomachine for an aircraft, FIG. 2 is a partial axial sectional view of a mechanical gearbox, FIG. 3 is a schematic axial cross-sectional view of a triple-flow turbomachine for an aircraft, FIG. 4 is a schematic axial sectional view of a triple-flow turbomachine for an aircraft in accordance with the invention, FIG. 5 is a schematic view in axial section of a portion of the power transmission module of the turbomachine according to the invention, according to a first embodiment of this invention, FIG. 6 is a schematic perspective view of the power transmission module according to the embodiment of FIG. 5, FIG. 7 is a schematic view in axial section of a portion of the power transmission module of the turbomachine according to the invention, according to a second embodiment of this invention; and FIG. 8 is a view similar to that of FIG. 4 and illustrates an alternative embodiment of the triple-flow turbomachine according to the invention.

DETAILED DESCRIPTION OF THE INVENTION

FIG. 1 describes a turbomachine 1 which conventionally comprises a fan S or fan propeller and a gas generator comprising a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The turbomachine 1 is here double-flow in the sense that two air flows, respectively primary F1 and secondary F2, flow along the longitudinal axis X of the turbomachine. The air inlet flow F entering the turbomachine and passing through the fan S is divided in two downstream of the fan by an annular splitter nose 17. A radially internal air flow flows within the splitter nose 17 and forms the primary flow F1 which flows within the gas generator. A radially external air flow flows out of the splitter nose 17 and forms the secondary flow F2 which flows around the gas generator.

The fan S is driven by a fan shaft 4 which is driven by the LP shaft 3 by means of a gearbox 6. This gearbox 6 is generally of the planetary or epicyclic type.

The following description relates to a gearbox of the epicyclic type, in which the planet carrier and the sun gear are rotatable, the ring gear of the gearbox being stationary in the reference frame of the engine.

The gearbox 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the gearbox 6. This enclosure E is here closed upstream by seals at the level of a bearing allowing the passage of the fan shaft 4, and downstream by seals at the level of the passage of the LP shaft 3.

FIG. 2 shows an epicyclic gearbox 6. In the input, the gearbox 6 is connected to the LP shaft 3, for example by means of internal splines 7a. Thus, the LP shaft 3 drives a planetary pinion referred to as the sun gear 7. Classically, the sun gear 7, whose axis of rotation is coincident with that of the longitudinal axis X, drives a series of pinions referred to as planet gears 8, which are equally spaced on the same diameter around the axis of rotation X. This diameter is equal to twice the operating centre distance between the sun gear 7 and the planet gears 8. The number of planet gears 8 is generally defined between three and seven for this type of application.

The set of planet gears 8 is held by a chassis referred to as planet carrier 10. Each planet gear 8 rotates around its own axis Y, and meshes with the ring gear 9.

In the output we have:

In this epicyclic configuration, the set of planet gears 8 rotatably drives the planet carrier 10a about the axis X of the turbomachine. The ring gear is attached to the engine casing or stator 5 via a ring gear carrier 12 and the planet carrier 10 is attached to the fan shaft 4.

In another planetary configuration, the set of the planet gears 8 is held by a planet carrier 10 which is attached to the engine casing or stator 5. Each planet gear drives the ring gear which is fitted to the fan shaft 4 via a ring gear carrier 12.

In another differential configuration, the set of planet gears 8 is held by a planet carrier 10 which is connected to a first fan shaft 5. Each planet gear drives the ring gear which is fitted to a second counter-rotating fan shaft 4 via a ring gear carrier 12.

Each planet gear 8 is mounted free in rotation by means of a bearing 11, for example of the rolling bearing or hydrodynamic bearing type. Each bearing 11 is mounted on one of the axles 10*b* of the planet carrier 10 and all axles are positioned relative to each other using one or more structural chassis 10*a* of the planet carrier 10. There are a number of axles 10*b* and bearings 11 equal to the number of planet gears. For reasons of operation, assembly, manufacture, inspection, repair or replacement, the axles 10*b* and the chassis 10*a* can be separated into several parts.

For the same reasons mentioned above, the toothing of a planet gear can be separated into several propellers or teeth each with a median plane P, P'. In our example, we detail the operation of a gearbox in which each planet gear comprises two series of herringbone teeth cooperating with a ring gear separated into two half ring gears:

an upstream half-ring gear 9*a* consisting of a rim 9*aa* and an attachment half-flange 9*ab*. On the rim 9*aa* is the front propeller meshed with a propeller of the toothing 8*d* of each planet gear 8. The propeller of the toothing 8*d* also meshes with that of the sun gear 7.

a downstream half-ring gear 9*b* consisting of a rim 9*ba* and an attachment half-flange 9*bb*. On the rim 9*ba* is the rear propeller meshed with a propeller of the toothing 8*d* of each planet gear 8. The propeller of the toothing 8*d* also meshes with that of the sun gear 7.

If the propeller widths vary between the sun gear 7, the planet gears 8 and the ring gear 9 because of the toothing overlaps, they are all centred on a median plane P for the upstream teeth and on another median plane P' for the downstream teeth.

FIG. 2 thus illustrates the case of a single gearing stage gearbox, i.e. a same toothing 8*d* of each planet gear 8 cooperates with both the sun gear 7 and the ring gear 9. Even though the toothing 8*d* comprises two series of teeth, these teeth have the same average diameter and form a single toothing referred to as herringbone.

The attachment half-flange 9*ab* of the upstream half-ring gear 9*a* and the attachment half-flange 9*bb* of the downstream half ring gear 9*b* form the attachment flange 9*c* of the ring gear. The ring gear 9 is attached to a ring gear carrier by assembling the attachment flange 9*c* of the ring gear and the attachment flange 12*a* of the ring gear carrier by means of a bolted mounting, for example.

The arrows in FIG. 2 describe the conveying of the oil in the gearbox 6. The oil enters the gearbox 6 from the stator portion 5 into a distributor 13 by different means which will not be specified in this view because they are specific to one or more types of architecture. The distributor 13 comprises injectors 13*a* and arms 13*b*. The function of the injectors 13*a* is to lubricate the toothings and the function of the arms 13*b* is to lubricate the bearings. The oil is fed to the injector 13*a* and exits through the end 13*c* to lubricate the toothings. The oil is also fed to the arm 13*b* and flows through the feed opening 13*d* of the bearing. The oil then flows through the axle into one or more buffer areas 10*c* and out through the orifices 10*d* in order to lubricate the bearings of the planet gears.

FIG. 3 shows an aircraft triple-flow turbomachine 100 in which flow three coaxial flows.

The references used in FIG. 1 are used in FIG. 3 to designate the same elements.

The air inlet flow F entering the turbomachine 100 and passing through the fan S, which is here a main fan, is split in two downstream of the fan S by an annular splitter nose 17. A radially internal air flow flows into the splitter nose 17 and forms the primary flow F1. A radially external air flow flows out of the splitter nose 17 and forms the secondary flow F2 which flows around the gas generator.

The turbomachine 1 comprises here a secondary fan S' which comprises a propeller or impeller located in the duct for the flow of the primary flow F1 and just upstream of another annular splitter nose 117.

The primary flow F1 passes through the secondary fan S' and is split in two by the splitter nose 117, a first internal air flow F11 flows inside the splitter nose 117 and the compressor 1*a* of the gas generator, and a second external air flow F12 flows outside the splitter nose 17 and around the compressor 1*a* and is then re-injected into the duct for the flow of the secondary flow F2.

The turbomachine 100 comprises a power transmission module 110 comprising a torque input 110*a* connected to the low-pressure shaft 3, a first torque output 110*b* connected to the main drive shaft 104 of the rotor and the propeller of the main fan S, and a second torque output 110*c* connected to the secondary drive shaft 114 of the rotor and the propeller of the secondary fan S'.

FIG. 4 illustrates a triple-flow turbomachine 100 in accordance with the invention.

The power transmission module 110 of this turbomachine 100 comprises a gearbox 6 similar to that of FIGS. 1 and 2, and further comprises a planet gear 120 independent of the gearbox 6 and arranged downstream of the gearbox 6.

The gearbox 6 comprises the torque input 110*a* and the first torque output 110*b*. As discussed above in connection with FIG. 2, the torque input 110*a* may be formed by the sun gear 7 of the gearbox 6 which is coupled to the low-pressure shaft 3, and the torque output 110*b* may be formed by the movable element of the gearbox 6 among its planet carrier 10*a* and its ring gear 12. In the case of FIG. 2 (epicyclic gearbox), it is the planet carrier 10*a* that is rotatable and thus coupled to the main shaft 104 for driving the main fan S. Alternatively, the gearbox could be planetary. The gearbox 6 can be single or double stage.

The planet gear 120 is meshed, on the one hand, with an external toothing 130 of the low-pressure shaft 3, and on the other hand, with an external toothing 140 of the secondary shaft 114 or with an intermediate shaft 150 coupled to this secondary shaft 114. The low-pressure shaft 3 passes coaxially through this secondary shaft 114 or this intermediate shaft 150. The shafts 114 and 150 may be coupled together by a set of axial splines, for example.

The external toothing 130 may be formed in one part on the low-pressure shaft 3 or may be fitted thereto and coupled thereto by a set of axial splines, for example.

Preferably, there is only one such planet gear 120, which simplifies the power transmission to the secondary fan S'.

According to a first embodiment shown in FIGS. 5 and 6, the planet gear 120 has a rotation axis Z parallel to the longitudinal axis X.

The planet gear 120 comprises a first toothing 120*a* meshed with the external toothing 130 of the low-pressure shaft 3, and a second toothing 120b meshed with the external toothing 140 of the secondary shaft 114 or the intermediate shaft 150. This second toothing 120b forms the aforementioned torque output 110c.

As shown in FIG. 5, the toothings 120a, 120b may have different diameters. These toothings can be straight or helical.

According to a second embodiment shown in FIG. 7, the planet gear 120 has an axis of rotation Z inclined with respect to the longitudinal axis X.

The planet gear 120 comprises a conical pinion 120c meshed with both the external toothings 130, 140, which are also conical, of the low-pressure shaft 3 and the secondary shaft 114 or the intermediate shaft 150.

FIG. 4 shows that the gearbox 6 has an external diameter D1 and that the planet gear 120 is surrounded by a circumference centred on the axis X which has a maximum external diameter D2. D2 is advantageously less than D1 so that the integration of the planet gear 120 downstream of the gearbox 6 does not result in an increase in the radial overall dimension of the power transmission module 110. In other words, the radial overall dimension of this module 110 is imposed by the gearbox 6 and not by the planet gear 120. FIG. 4 also allows to show that the transmission module 110 is located inside an annular casing 160 which comprises two coaxial annular walls 160a, 160b defining between them the duct for the flow of the primary flow F1.

The main shaft 104 is rotatably guided by at least one bearing 170a carried by a first annular support 170 attached to the casing 160. The secondary shaft 114 or the intermediate shaft 150 is rotatably guided by at least one bearing 180a carried by a second annular support 180 attached to the casing 160. The bearings 170a, 180a are located upstream and downstream of the module 110 respectively (FIG. 4).

FIGS. 5 and 7 show that the low-pressure shaft 3 may be rotatably guided by one or two bearings in the vicinity of or at the level of the module 110. In the case of FIG. 5, the shaft 3 is guided by two bearings 180b in this area, which are located respectively upstream and downstream of the toothings 130, 140 in order to reduce the overhang of the shaft 3.

The planet gear 120 is passed through by a physical axle 190, as schematically shown in FIG. 4.

In a first configuration illustrated in FIG. 5, the planet gear 120 is rotatably driven by this physical axle 190. A plain bearing or rolling bearings may then be provided between the planet gear 120 and the physical axle 190. This physical axle 190 is carried by the bearing support 180 or by the casing 160 directly.

In the embodiment shown in FIG. 7, the planet gear 120 may be rotatably integral with the physical axle 190 which is then rotatably guided by at least one bearing. This bearing is carried by the bearing support 180 or by the casing 160 directly.

In the alternative embodiment shown in FIG. 8, the planet gear 120 has an axis of rotation Z that is coincident with the axis of rotation X of the turbine shaft 3. Here, the planet gear 120 has an annular shape and is axially passed through by the turbine shaft 3. The planet gear 120 comprises a first toothing 120a meshed with the external toothing 130 of the turbine shaft 3, and a second toothing 120b meshed with the external toothing 140 of the secondary shaft 114 or of the intermediate shaft 150.

In the illustrated example, the planet gear 120 is rotatably guided by two bearings 200a carried by a third annular support 200 attached to the casing 160. This third support 200 is here located between the first and second supports 170, 180. The bearings 200a have equivalent diameters, which are larger than that of the bearing 170b and smaller than that of the bearing 170a.

The power transmission module according to the invention allows, from the high speed transmitted by the low-pressure shaft 3, to provide two outputs with two different speeds, while minimizing the mass and the overall dimension of the gearbox of this module. The invention is particularly suitable for low reduction ratios, e.g. less than two, and for powers in the megawatt range.

The invention claimed is:

1. A triple-flow turbomachine for an aircraft, comprising:
   a gas generator equipped with a turbine comprising a turbine shaft with an axis of rotation,
   a power transmission module comprising a torque input connected to said turbine shaft, a first torque output and a second torque output, this power transmission module comprising a mechanical gearbox (6) comprising said torque input and said first torque output,
   a main fan propeller rotatably driven by a main shaft coupled to the first torque output, this propeller being located upstream of a first annular splitter nose for separating two annular ducts for the respective flow of an internal primary flow (F1) and an external secondary flow,
   a secondary fan propeller rotatably driven by a secondary shaft coupled to the second torque output (110c), this propeller being located in the duct for the flow of the primary flow and upstream of a second annular splitter nose for separating two annular ducts for the respective flow of a first internal flow and a second external flow,
   wherein the power transmission module further comprises a planet gear independent of said gearbox and arranged downstream of the gearbox, this planet gear being meshed, on the one hand, with an external toothing of the turbine shaft and on the other hand, with an external toothing of said secondary shaft or with an intermediate shaft coupled to this secondary shaft, said turbine shaft passing coaxially through this secondary shaft or this intermediate shaft.

2. The turbomachine of claim 1, wherein said planet gear is a sole planet gear of said power transmission module.

3. The turbomachine according to claim 1, wherein said planet gear extends about an axis of rotation parallel to said axis of rotation of the turbine shaft, said planet gear comprising a first toothing meshed with the external toothing of the turbine shaft, and a second toothing meshed with the external toothing of the secondary shaft or of the intermediate shaft.

4. The turbomachine according to claim 1, wherein said planet gear extends about an axis of rotation inclined with respect to said axis of rotation of the turbine shaft, said planet gear comprising a conical pinion meshed with both the external toothings, which are also conical, of the turbine shaft and of the secondary shaft or of the intermediate shaft.

5. The turbomachine according to claim 1, wherein said planet gear extends about an axis of rotation coincident with the axis of rotation of the turbine shaft, said planet gear having an annular shape and being passed through by said turbine shaft, said planet gear comprising a first toothing meshed with the external toothing of the turbine shaft, and a second toothing meshed with the external toothing of the secondary shaft or of the intermediate shaft.

6. The turbomachine according to claim 1, wherein the gearbox comprises an external diameter D1, and the planet gear is surrounded by a circumference centred on said axis of rotation of the turbine shaft, this circumference having a maximum external diameter D2 which is smaller than D1.

7. The turbomachine according to claim 1, wherein the transmission module is located inside an annular casing which comprises two coaxial annular walls defining between them said duct for the flow of the primary flow.

8. The turbomachine according to claim 7, wherein the main shaft is rotatably guided by at least one bearing carried by a first annular support attached to said casing, and the secondary shaft or the intermediate shaft is rotatably guided by at least one bearing carried by a second annular support attached to said casing.

9. The turbomachine according to claim 8, wherein the planet gear comprises a physical axle which passes through it and is rotatably driven by this physical axle, this physical axle being carried by said second bearing support or by said casing.

10. The turbomachine according to claim 8, wherein the planet gear is rotatably guided by at least one bearing carried by a third annular support attached to said casing, the third annular support being located between the first and second annular supports.

* * * * *